US012710170B2

(12) United States Patent
Yan

(10) Patent No.: US 12,710,170 B2
(45) Date of Patent: Aug. 18, 2026

(54) LIGHT ADJUSTMENT DEVICE, PHOTOGRAPHY LIGHT, AND PHOTOGRAPHY SYSTEM

(71) Applicant: Shenzhen Leqi Innovation Co., Ltd., Shenzhen (CN)

(72) Inventor: Keman Yan, Shenzhen (CN)

(73) Assignee: SHENZHEN LEQI INNOVATION CO., LTD., Shenzhen (CN)

( * ) Notice: Subject to any disclaimer, the term of this patent is extended or adjusted under 35 U.S.C. 154(b) by 0 days.

(21) Appl. No.: 19/270,408

(22) Filed: Jul. 15, 2025

(65) Prior Publication Data

US 2025/0341304 A1 Nov. 6, 2025

Related U.S. Application Data

(63) Continuation of application No. PCT/CN2023/132322, filed on Nov. 17, 2023.

(30) Foreign Application Priority Data

Mar. 29, 2023 (CN) ......................... 202310315727.8

(51) Int. Cl.
*F21V 29/67* (2015.01)
*F21S 9/04* (2006.01)
(Continued)

(52) U.S. Cl.
CPC ............. *F21V 29/504* (2015.01); *F21S 9/04* (2013.01); *F21V 5/045* (2013.01); *F21V 14/06* (2013.01);
(Continued)

(58) Field of Classification Search
CPC ........ F21V 29/677; F21V 29/83; F21V 29/67; F21V 29/673; F21V 9/04; F21V 5/04; F21V 14/06
See application file for complete search history.

(56) References Cited

U.S. PATENT DOCUMENTS 5,419,780 A * 5/1995 Suski ...................... H01L 23/38 136/224
7,575,346 B1 * 8/2009 Horng ..................... F21V 29/83 362/373
2012/0206046 A1 * 8/2012 Huang .................. G02B 27/20 315/118

FOREIGN PATENT DOCUMENTS

CN 105529955 A 4/2016
CN 205956812 U 2/2017
(Continued)

OTHER PUBLICATIONS

International Search Report of PCT Patent Application No. PCT/CN2023/132322 issued on Dec. 14, 2023.
(Continued)

*Primary Examiner* — William J Carter
(74) *Attorney, Agent, or Firm* — Andrew C. Cheng

(57) ABSTRACT

A light adjustment device comprises: a mounting component, internally forming a mounting cavity, provided with a plurality of heat dissipation holes communicating with the mounting cavity; a lens barrel, comprising a barrel body and a lens, with one end of the barrel body located inside the mounting cavity and the other end located outside the mounting cavity; and a heat dissipation component, disposed at one of the heat dissipation holes, the heat dissipation component comprising a motor and fan blades connected to the motor, to discharge heat from the mounting cavity and the lens barrel to the exterior through flowing air. By promptly expelling the hot air inside the mounting cavity and the lens barrel through ventilation or forced air cooling, it can be ensured that the temperature of the light adjustment device does not become excessively high, thereby preventing scalding or burns during prolonged use.

17 Claims, 9 Drawing Sheets

(51) Int. Cl.
*F21V 5/04* (2006.01)
*F21V 14/06* (2006.01)
*F21V 29/15* (2015.01)
*F21V 29/504* (2015.01)
*F21V 29/61* (2015.01)
*F21V 29/83* (2015.01)
*G03B 15/02* (2021.01)

(52) U.S. Cl.
CPC .............. *F21V 29/15* (2015.01); *F21V 29/61* (2015.01); *F21V 29/677* (2015.01); *F21V 29/83* (2015.01); *G03B 15/02* (2013.01)

(56) References Cited

FOREIGN PATENT DOCUMENTS

| | | |
|---|---|---|
| CN | 110425505 A | 11/2019 |
| CN | 114545719 A | 5/2022 |
| CN | 116025881 A | 4/2023 |

OTHER PUBLICATIONS

The first Office Action of CN patent application No. 202310315727.8 issued on May 6, 2023.
The second Office Action of CN patent application No. 202310315727.8 issued on May 26, 2023.
The second search report of CN patent application No. 202310315727.8 issued on May 26, 2023.
The third Office Action of CN patent application No. 202310315727.8 issued on Jun. 14, 2023.

* cited by examiner

LIGHT ADJUSTMENT DEVICE, PHOTOGRAPHY LIGHT, AND PHOTOGRAPHY SYSTEM

CROSS-REFERENCE TO RELATED APPLICATIONS

The present invention is a continuation of International Patent Application No. PCT/CN2023/132322 filed on Nov. 17, 2023, which claims the priority of China Patent Application No. 202310315727.8 filed on Mar. 29, 2023, the entire contents of which are incorporated herein by reference.

TECHNICAL FIELD

The present invention relates to the technical field of photography equipment, and more particularly to a light adjustment device, a photography light, and a photography system.

BACKGROUND

During image shooting operations, a photography light serves as a critical apparatus. Across diverse shooting scenarios, a photography light is essential for executing primary illumination and supplementary lighting functions, thereby facilitating the capture of high-definition imagery through optimized luminance control.

The application of photography lights in photography is not limited to scene lighting and subject lighting, but is mainly used to create various lighting effects through light adjustment devices. For example, when shooting an indoor scene on a cloudy day, project a circular spotlight on the window to simulate the sun, or project warm light onto the corresponding person to simulate the scene of the person roasting by the stove.

Light adjustment devices typically include a Fresnel lens and a lens barrel. When the Fresnel lens is used with a high-power lamp (COB lamp) for an extended period, the surface temperature of the lens barrel increases (potentially reaching over 130° C.), which can lead to burns or scalds for users operating the light adjustment device, or thermal deformation of the Fresnel lens.

Technical Problem

The objective of the present invention is to provide a light adjustment device, to solve the technical problem of poor heat dissipation in existing light adjustment devices.

Technical Solution

To achieve the aforementioned objective, the present invention provides a light adjustment device, comprising:

- a mounting component, internally forming a mounting cavity, the mounting component being provided with a plurality of heat dissipation holes communicating with the mounting cavity;
- a lens barrel, comprising a barrel body and a lens, with one end of the barrel body located inside the mounting cavity and the other end located outside the mounting cavity, and the lens being disposed within the barrel; and
- a heat dissipation component, disposed at one of the heat dissipation holes, the heat dissipation component comprising a motor and fan blades connected to the motor, to discharge heat from the mounting cavity and the lens barrel to the exterior through flowing air.

In some embodiments, the light adjustment device further comprises a thermoelectric generator, disposed on the mounting component and electrically connected to the motor;

- one end of the thermoelectric generator is in contact with the air inside the mounting cavity, and the other end is in contact with the air outside the mounting cavity, so as to generate a temperature difference between the two ends of the thermoelectric generator and convert thermal energy into electrical energy.

In some embodiments, the mounting component is provided with a first mounting hole, the first mounting hole is arranged at one end of the mounting component away from the lens and communicates with the mounting cavity, and the thermoelectric generator is arranged at the first mounting hole.

In some embodiments, the light adjustment device comprises a heat-absorbing component disposed within the mounting cavity for absorbing heat within the mounting cavity; and

- one end of the thermoelectric generator is in close contact with the heat-absorbing component.

In some embodiments, the heat-absorbing component is configured with a hollow structure, and the heat-absorbing component is used to enclose a periphery of a light source assembly for isolating the light source assembly from the mounting component.

In some embodiments, one end of the lens barrel is sleeved between the mounting component and the heat-absorbing component.

In some embodiments, the heat-absorbing component comprises:

- a first barrel portion, connected to the end of the mounting component that is distal to the lens and in close contact with one end of the thermoelectric generator; and
- a second barrel portion, connected to the first barrel portion, wherein the diameter of the second barrel portion gradually increases from the end of the mounting component away from the lens to an end close to the lens.

In some embodiments, an inner side of the heat-absorbing component is provided with a light-absorbing inner lining layer.

In some embodiments, the light adjustment device further comprises a heat sink, disposed on the mounting component at the end away from the lens and located outside the mounting cavity; and

- the heat sink is in close contact with the thermoelectric generator at an end away from the heat-absorbing component.

In some embodiments, the light adjustment device further comprises:

- a fastener, with one end abutting the heat sink and the other end sequentially passing through the heat sink and the first mounting hole, then connecting to the heat-absorbing component; and
- an insulating sleeve, fitted onto the fastener and positioned on a side of the heat sink away from the lens.

In some embodiments, the light adjustment device further comprises a scald-proof cover arranged on an outer side of the end of the mounting component away from the lens, for isolating the heat sink from the exterior.

In some embodiments, the light adjustment device further comprises a thermal insulation layer disposed on an inner circumferential surface of the barrel body for reducing the temperature of the barrel body.

In some embodiments, an outer surface of the heat-absorbing component is provided with a plurality of guide plates, the guide plates are arranged along a circumferential direction of the heat-absorbing component, and the guide plates extend along an axial direction of the lens barrel.

In some embodiments, the guide plates extend along the axial direction of the lens barrel and are inclined along a circumferential direction of the lens barrel.

In some embodiments, the mounting component is provided with a second mounting hole communicating with the mounting cavity, and the light adjustment device further comprises:

- a focusing component, disposed at the second mounting hole and connected to the barrel body, for driving the lens barrel to move in a direction towards or away from the mounting component, so that the focal length of the lens barrel is adjusted to a predetermined focal length.

In some embodiments, the barrel body is provided with a limiting sliding groove extending along its circumference, and the focusing component comprises:

- an actuator;
- a pushing component, movably mounted in the limiting sliding groove along a length direction of the limiting sliding groove, used to push the barrel body to move in the direction of towards or away from the mounting component; and
- a transmission component, one end of which is connected to the pushing component, and the other end is connected to the actuator, for transmitting the power generated by the actuator to the pushing component.

In some embodiments, the transmission component comprises:

- a rotating disk, rotatably arranged at the second mounting hole, one side of which is formed with a receiving groove, a peripheral wall of the receiving groove being provided with transmission teeth, and the pushing component being connected to the other opposite side of the rotating disk;
- a driving gear, rotatably arranged within the receiving groove and connected to the actuator; and
- a driven gear, rotatably arranged on one side of the driving gear, the driven gear meshing with the driving gear and the transmission teeth respectively. the transmission component comprises:
- a rotating disk, rotatably arranged at the second mounting hole, one side of which is formed with a receiving groove, a peripheral wall of the receiving groove being provided with transmission teeth, and the pushing component being connected to the other opposite side of the rotating disk;
- a driving gear, rotatably arranged within the receiving groove and connected to the actuator; and
- a driven gear, rotatably arranged on one side of the driving gear, the driven gear meshing with the driving gear and the transmission teeth respectively.

The present invention further provides a photography light, comprising a light source assembly and a light adjustment device as described in the foregoing embodiments.

The present invention further provides a photography system, comprising a photography device and the photography light described above.

The light adjustment device according to the present invention is provided with at least two heat dissipation holes on the mounting component, one of which is used as an air inlet and the other as an air outlet, and the fan blades are arranged at the air inlet or the air outlet. When the fan blades are arranged at the air inlet, the fan blades are used to blow the hot air inside the mounting cavity and the lens barrel out through the air outlet, and at the same time, the external cold air flows into the mounting cavity and the lens barrel through the air inlet, thereby achieving heat dissipation. When the fan blades are arranged at the air outlet, the fan blades are used to extract the hot air inside the mounting cavity and the lens barrel through the air outlet, and at the same time, the external cold air flows into the mounting cavity and the lens barrel through the air inlet, thereby achieving heat dissipation. The light adjustment device according to the present invention, when used in conjunction with a light source assembly, employs a motor to drive the fan blades. By promptly expelling the hot air inside the mounting cavity and the lens barrel through ventilation or forced air cooling, it can be ensured that the temperature of the light adjustment device does not become excessively high, thereby preventing scalding or burns during prolonged use.

Figure 1:
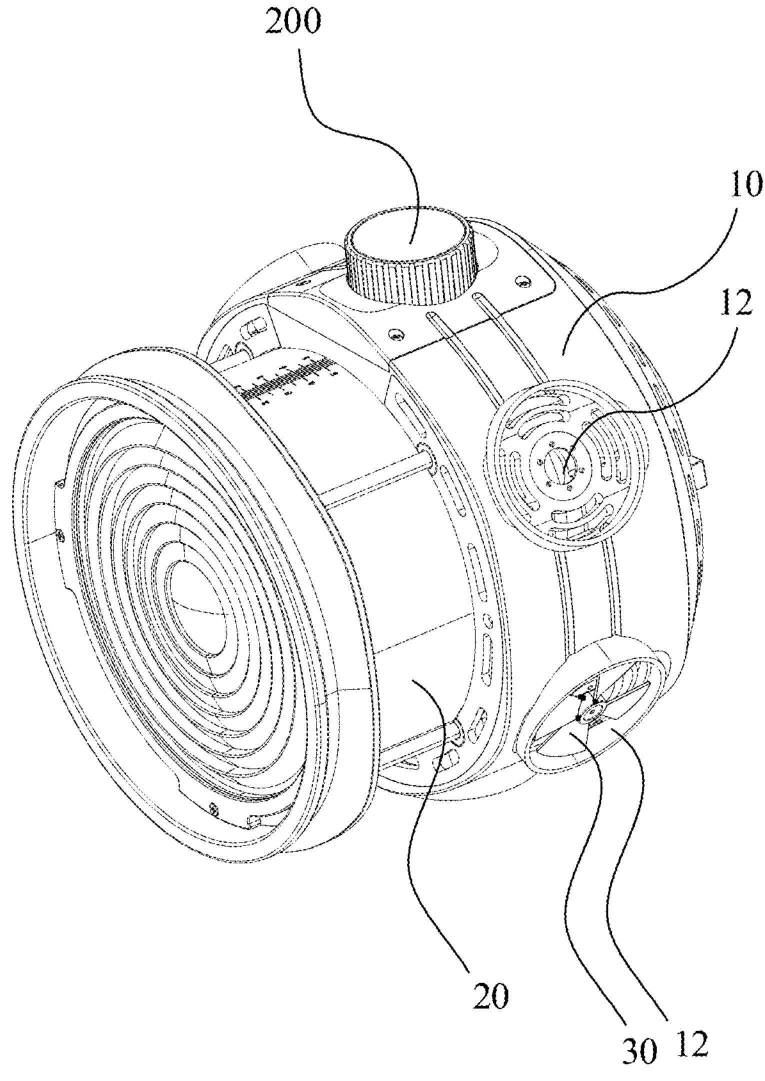
FIG. 1 is a structural diagram of a light adjustment device according to an embodiment of the present invention.

The realization of the objective, functional characteristics, and advantages of the present invention will be further described in conjunction with the embodiments and with reference to the accompanying drawings.

DESCRIPTION OF THE EMBODIMENTS

The following will provide a clear and complete description of the solutions in the embodiments of the present invention, in conjunction with the accompanying drawings. It is evident that the described embodiments are only a part of the embodiments of the present invention, and not all of the embodiments. Based on the embodiments of the present invention, all other embodiments obtained by those skilled in the art without making creative efforts fall within the scope of the present invention.

It should be noted that all directional indications (such as up, down, left, right, front, back, etc.) in the embodiments of the present invention are only used to explain the relative positional relationship, movement, and other aspects between the components under a specific posture (as shown in the accompanying drawings). If the specific posture changes, the directional indication will also change accordingly.

It should also be noted that when an element is referred to as being "fixed to" or "set on" another element, it can be directly on the other element or there may be centering elements present at the same time. When an element is referred to as being "connected to" another element, it can be directly connected to the other element or there may be centering elements present at the same time.

Furthermore, the descriptions involving "first", "second", etc., in the present invention are only for descriptive purposes and should not be understood as indicating or implying their relative importance or implicitly specifying the quantity of the indicated technical features. Thus, features defined with "first" and "second" can explicitly or implicitly include at least one of the features. In addition, the technical solutions of each embodiment can be combined with each other, but it must be based on the realization by those of ordinary skill in the art. When the combination of technical solutions appears contradictory or cannot be realized, it should be considered that the combination of technical solutions does not exist and is not within the scope of protection required by the present invention.

The light adjustment device involved in the embodiments of the present invention is mainly applied to photography auxiliary lights to adjust the lighting effect, so that the light generated by the photography auxiliary lights can meet the requirements of various different scenes. When the photography auxiliary light is used in conjunction with the light adjustment device, the light emitted from the light source of the photography auxiliary light will illuminate the surface of the light adjustment device. Because the power of the light source of the photography auxiliary light is high, the surface temperature of the light adjustment device may become high after prolonged use, which may cause scalding or burns during use, and may even cause thermal deformation of the Fresnel lens.

Therefore, the embodiments of the present invention creatively provide a light adjustment device with an active heat dissipation function, which mainly involves configuring a motor and fan blades on the light adjustment device. When the light adjustment device is used in conjunction with an auxiliary photographic light, the motor operates to initiate the rotation of the fan blades, thereby discharging the hot air inside the light adjustment device to the external air.

Figure 2:
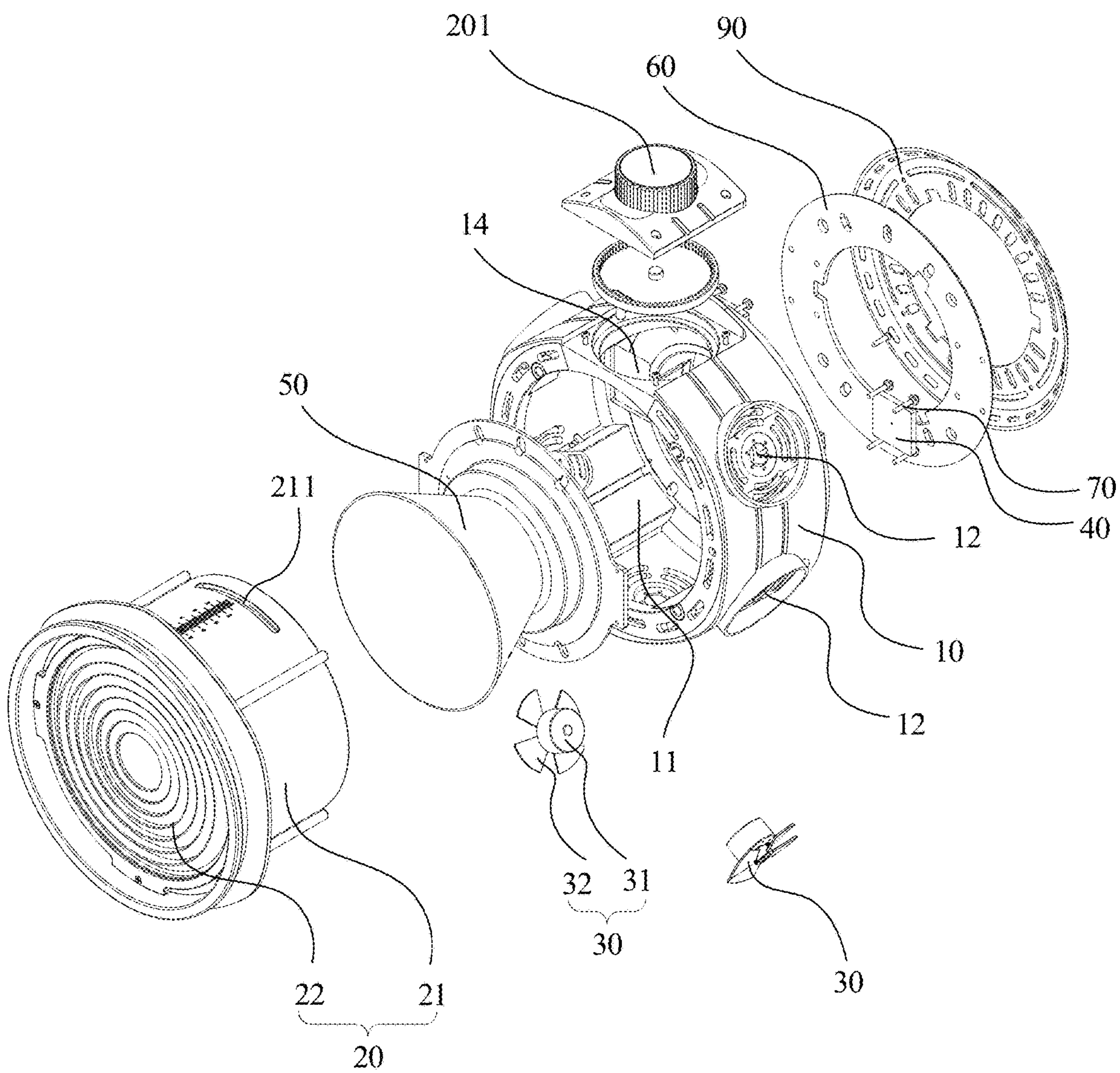
FIG. 2 is an exploded view of the light adjustment device in FIG. 1.
Figure 3:
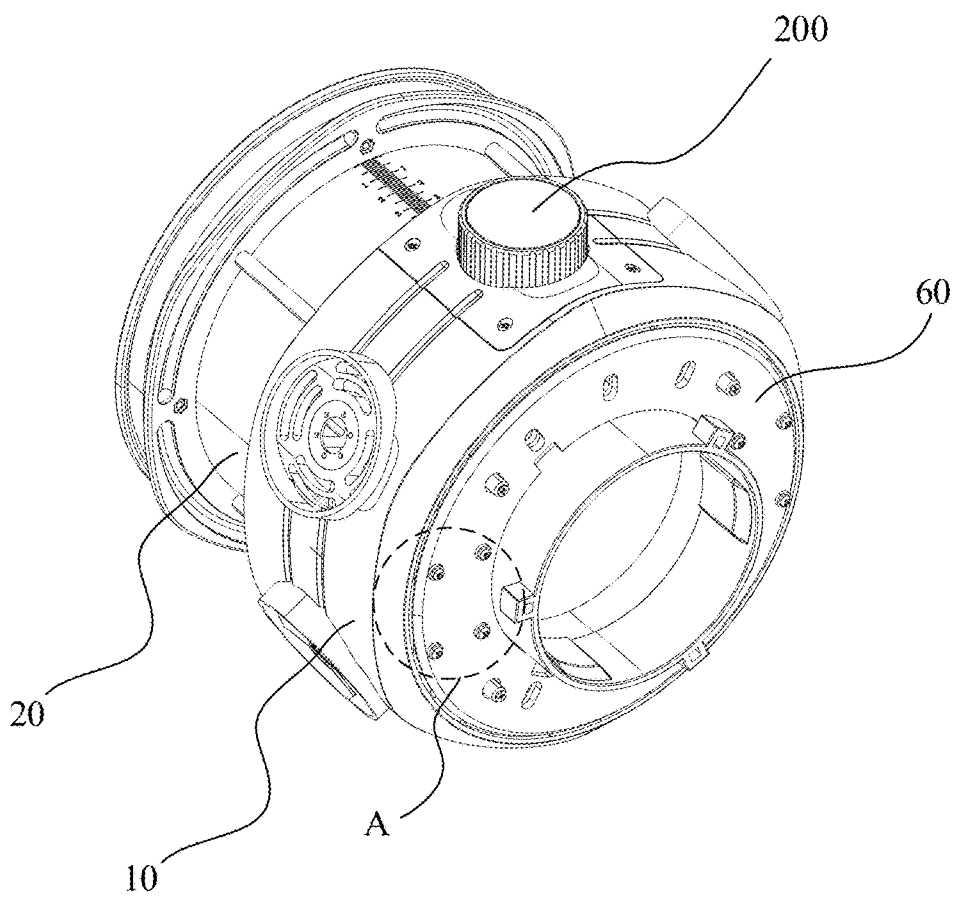
FIG. 3 is a structural diagram of the light adjustment device in FIG. 1 without a scald-proof cover assembled.
Figure 4:
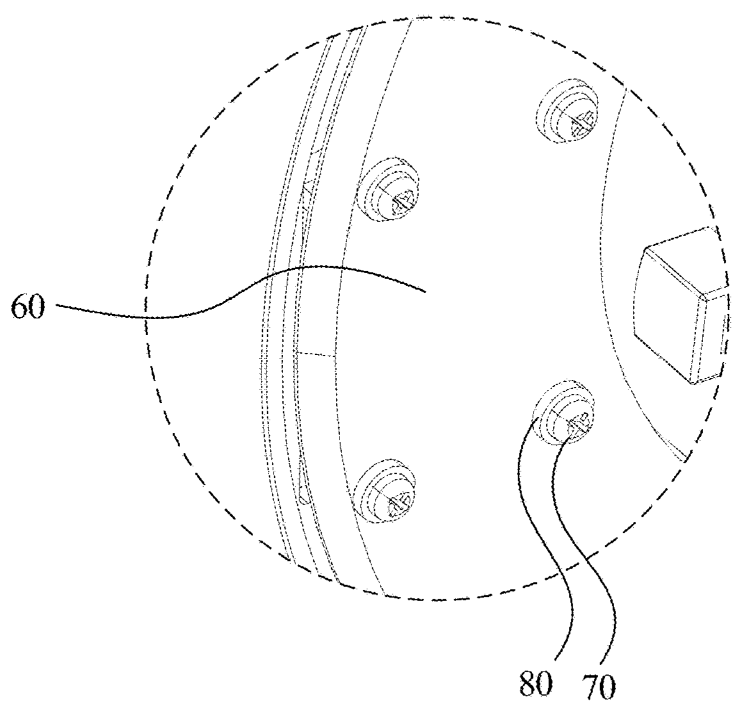
FIG. 4 is a partially enlarged diagram at A in FIG. 3.

In some embodiments, referring to FIG. 1 and FIG. 2, the light adjustment device of the present invention comprises:

- a mounting component 10, internally forming a mounting cavity 11, and the mounting component 10 being provided with a plurality of heat dissipation holes 12 communicating with the mounting cavity 11;
- a lens barrel 20, comprising a barrel body 21 and a lens 22, with one end of the barrel body 21 being located in the mounting cavity 11 and the other end being located outside the mounting cavity 11, and the lens 22 being arranged in the lens barrel 20;
- a heat dissipation component 30, disposed at one of the heat dissipation holes 12, the heat dissipation component 30 comprising a motor 31 and fan blades 32 connected to the motor 31, to discharge heat from the mounting cavity 11 and the lens barrel 20 is discharged to the exterior through flowing air.

In the embodiments, the mounting component 10 is internally hollow to form the mounting cavity 11. The mounting component 10 is provided with a first opening and a second opening at two ends, respectively. The first opening is used for the lens barrel 20 to be inserted into the mounting cavity 11, and the second opening is used for a photography light to be inserted into the mounting cavity 11. A plurality of heat dissipation holes 12 are defined in the mounting component 10, and each heat dissipation hole 12 is in communication with the mounting cavity 11. Hot air inside the mounting cavity 11 and the lens barrel 20 is discharged into the external air through at least one of the heat dissipation holes 12, and cold air from the outside enters the mounting cavity 11 and the lens barrel 20 through at least one of the heat dissipation holes 12. When heat is generated inside the mounting cavity 11 and the lens barrel 20, the heat dissipation component 30 starts to work, that is, the motor 31 starts to run to drive the fan blades 32 to rotate, thereby extracting or blowing the hot air inside the mounting cavity 11 and the lens barrel 20 to the outside air, realizing timely heat dissipation for the light adjustment device.

Optionally, the mounting component 10 can be configured as an annular frame, with several heat dissipation holes 12 distributed at intervals on the side wall along the circumference of the annular frame, and the heat dissipation component 30 is arranged at one of the heat dissipation holes 12. An annular protrusion is provided around the heat dissipation hole 12, and the fan blades 32 are located within the annular protrusion.

It should be noted that the number of heat dissipation holes 12 and heat dissipation components 30 is not limited here, and those skilled in the art can design according to actual situations. For example, there are five heat dissipation holes 12 are five, and two heat dissipation components 30. The two heat dissipation components 30 are respectively arranged at two heat dissipation holes 12. When the two heat dissipation components 30 dissipate heat by means of exhaust, the two heat dissipation holes 12 where the two heat dissipation components 30 are located are air outlets, and the other three heat dissipation holes 12 are air inlets. That is, external cold air enters the mounting cavity 11 and the lens barrel 20 through the three heat dissipation holes 12 without heat dissipation components 30, and the hot air in the mounting cavity 11 and the lens barrel 20 is discharged through the two heat dissipation holes 12 with the two heat dissipation components 30. When the two heat dissipation components 30 dissipate heat by means of blowing, the two heat dissipation holes 12 with the two heat dissipation components 30 are air inlets, and the other three heat dissipation holes 12 are air outlets, that is, external cold air enters the mounting cavity 11 and the lens barrel 20 through the two heat dissipation holes 12 with the two heat dissipation components 30, and the hot air in the mounting cavity 11 and the lens barrel 20 is discharged through the three heat dissipation holes 12 without heat dissipation components 30.

Optionally, the lens 22 comprises a Fresnel lens 22.

Optionally, the mounting component 10 may be equipped with a temperature sensor to monitor the temperature within the mounting cavity 11 and the lens barrel 20. When the temperature monitored by the temperature sensor reaches a preset temperature threshold, the motor 31 starts running to drive the fan blades 32 to rotate, thereby exhausting the hot air from the mounting cavity 11 and the lens barrel 20 to the exterior. That is, the heat dissipation component 30 is activated only when the temperature inside the mounting cavity 11 and the lens barrel 20 reaches the preset temperature threshold. Furthermore, the rotation speed of the motor 31 can be controlled according to the monitored temperature. For example, the higher the temperature, the faster the motor 31 rotates, and the lower the temperature, the slower the motor 31 rotates.

In some embodiments, referring to FIG. 2, the light adjustment device further comprises:

- a thermoelectric generator 40 is disposed on the mounting component 10 and electrically connected to the motor 31. One end of the thermoelectric generator 40 is in contact with the air inside the mounting cavity 11, and the other end is in contact with the air outside the mounting cavity 11, so as to generate a temperature difference at both ends of the thermoelectric generator 40 and convert thermal energy into electrical energy.

In the embodiments, in order to utilize the thermal energy of a light source assembly, the thermoelectric generator 40 is arranged on the mounting component 10 to convert thermal energy into electrical energy through the thermoelectric generator 40 and supply it to the motor 31, so as to be used as a power source for the operation of the motor 31, so that there is no need to specifically configure a power source for the motor 31, which can reduce costs, reduce weight, and reduce volume.

It should be noted that the thermoelectric generator 40 is a power generation device that directly converts thermal energy into electrical energy using the Seebeck effect. The thermoelectric generator 40 has a cold end and a hot end, with the cold end in contact with the air outside the mounting cavity 11 and the hot end in contact with the air inside the mounting cavity 11. Since the temperature of the air inside the mounting cavity 11 is higher and the temperature of the air outside the mounting cavity 11 is lower, there is a temperature difference between the cold end and hot end of the thermoelectric generator 40, thereby converting thermal energy into electrical energy.

Optionally, there are two thermoelectric generators 40, with the two thermoelectric generators 40 symmetrically arranged on both sides of the mounting component 10.

Figure 5:
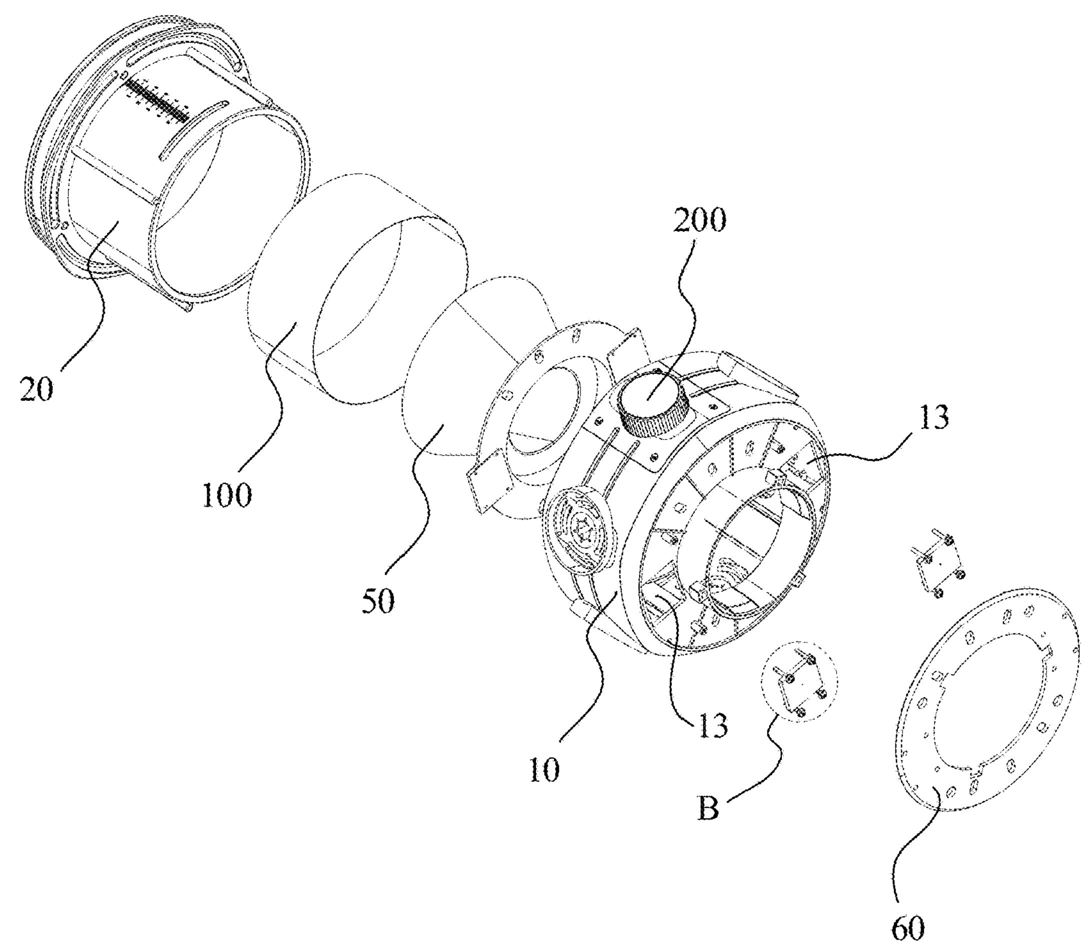
FIG. 5 is an exploded view of the light adjustment device in FIG. 3.
Figure 6:
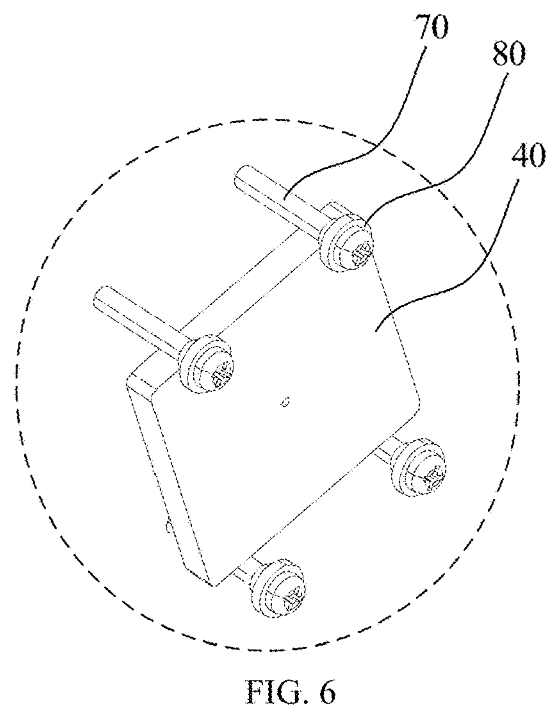
FIG. 6 is a partially enlarged diagram at B in FIG. 5.
Figure 10:
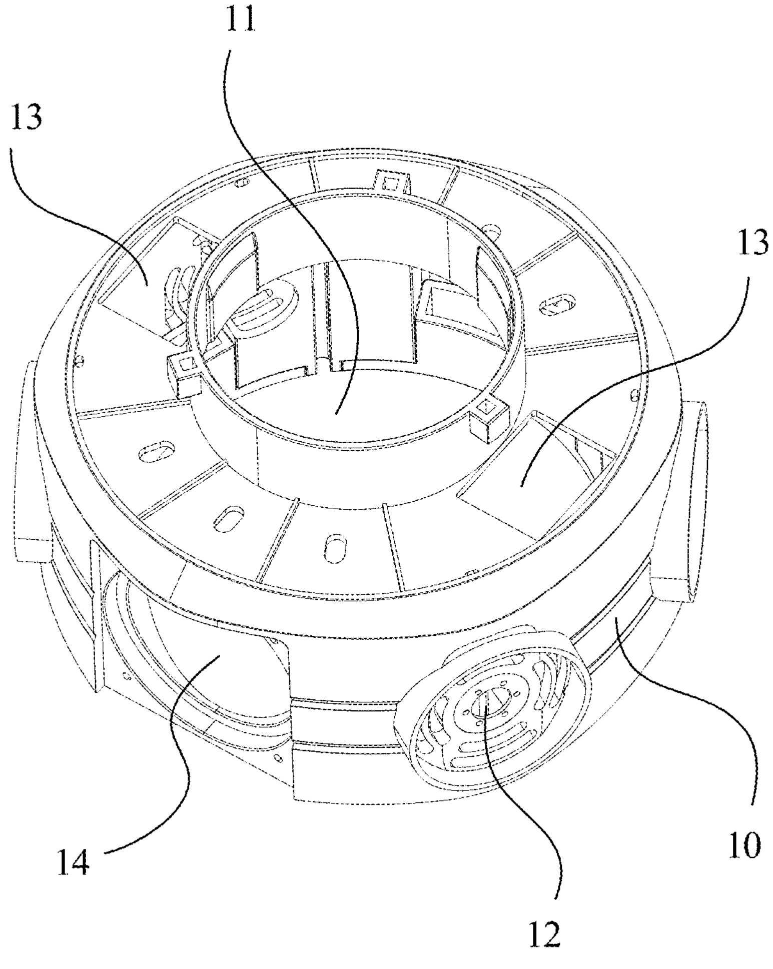
FIG. 10 is a structural diagram of the mounting component in FIG. 5.

In some embodiments, referring to FIGS. 5 and 10, the mounting component 10 further includes a first mounting hole 13, the first mounting hole 13 is disposed at an end of the mounting component 10 away from the lens 22 and communicates with the mounting cavity 11, and the thermoelectric generator 40 is disposed at the first mounting hole 13.

In the embodiments, the first mounting hole 13 is defined on the mounting component 10, and the first mounting hole 13 communicates with the mounting cavity 11 and the exterior, respectively. The thermoelectric generator 40 is located in the first mounting hole 13, with the hot end of the thermoelectric generator 40 towards the mounting cavity 11 to contact the air inside the mounting cavity 11, and the cold end of the thermoelectric generator 40 away from the mounting cavity 11 to contact the air outside the mounting cavity 11. The hot end of the thermoelectric generator 40 may be located in the first mounting hole 13, or may be flush with an end face of the first mounting hole 13 near the mounting cavity 11, or may protrude into the mounting cavity 11. Those skilled in the art can design according to the actual situation.

In some embodiments, referring to FIG. 2 and FIG. 5, the light adjustment device further comprises:

- a heat-absorbing component 50 disposed within the mounting cavity 11 for absorbing heat within the mounting cavity 11. One end of the thermoelectric generator 40 is in close contact with the heat-absorbing component 50.

In the embodiments, in order to more fully utilize thermal energy, and to concentrate the heat in the mounting cavity 11 and the lens barrel 20 to the hot end of the thermoelectric generator 40, the heat-absorbing component 50 is arranged in the mounting cavity 11. The hot end of the thermoelectric generator 40 is at least partially in contact with the heat-absorbing component 50, so that the heat-absorbing component 50 absorbs thermal energy and transfers it to the hot end of the thermoelectric generator 40, so that there is a temperature difference between the hot end and the cold end of the thermoelectric generator 40, thereby converting thermal energy into electrical energy.

In some embodiments, referring to FIG. 2, FIG. 5, FIG. 7, and FIG. 8, the heat-absorbing component 50 is hollow, and the heat-absorbing component 50 is used to enclose a periphery of a light source assembly to isolate the light source assembly 1 from the mounting component 10.

In the embodiments, the light source assembly 1 can be isolated from the mounting component 10 by the heat-absorbing component 50, so that the light emitted from the light source assembly 1 cannot directly irradiate the surface of the mounting component 10, which can play a role in heat insulation, thereby reducing the temperature of the surface of the mounting component 10. In addition, the heat-absorbing component 50 can also block the light from the light source assembly 1 from transmitting through the heat dissipation holes 12 of the mounting component 10, thereby avoiding light leakage.

In some embodiments, referring to FIG. 2, one end of the lens barrel 20 is sleeved between the mounting component 10 and the heat-absorbing component 50.

In the embodiments, in order to allow light emitted from the light source assembly 1 to propagate into the lens barrel 20, one end of the lens barrel 20 is fitted to the heat-absorbing component 50.

Figure 8:
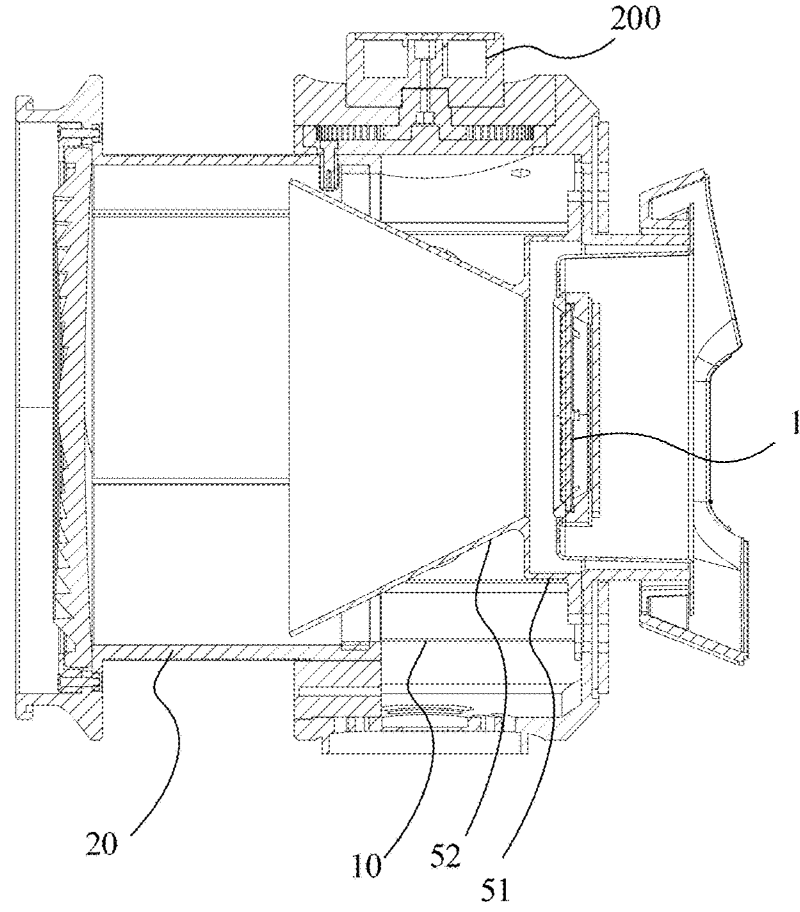
FIG. 8 is a cross-sectional view of the light adjustment device assembled the light source assembly in FIG. 7.

In some embodiments, referring to FIG. 8, the heat-absorbing component 50 comprises:

- a first barrel portion 51, connected to the end of the mounting component 10 away from the lens 22 and in close contact with one end of the thermoelectric power generation element 40; and
- a second barrel portion 52, connected to the first barrel portion 51, wherein the diameter of the second barrel portion 52 gradually increases from the end of the mounting component 10 away from the lens 22 to an end close to the lens 22.

In the embodiments, the heat-absorbing component 50 includes the first barrel portion 51 and the second barrel portion 52 connected to each other. When used in conjunction with a photography light, the light source assembly 1 of the photography light is located within the first barrel portion 51. To enable the heat-absorbing component 50 to have a light-concentrating effect, the second barrel portion 52 is generally configured in a flared shape, that is, the diameter of the second barrel portion 52 gradually increases from the end of the mounting component 10 away from the lens 22 to the end close to the lens 22.

In some embodiments, an inner side of the heat-absorbing component 50 is provided with a light-absorbing inner lining layer.

In the embodiments, the light-absorbing inner lining layer can reduce the reflection of light irradiated on an inner wall of the heat-absorbing component 50, thereby ensuring the light transmission of the lens 22. In addition, in the embodiments, the light-absorbing inner lining layer adopts a graphene coating, which combines light absorption and thermal conductivity to aid in cooling. Of course, in other embodiments, the light-absorbing inner lining layer may also be a graphite coating or a carbon nanotube coating, and so on.

Figure 7:
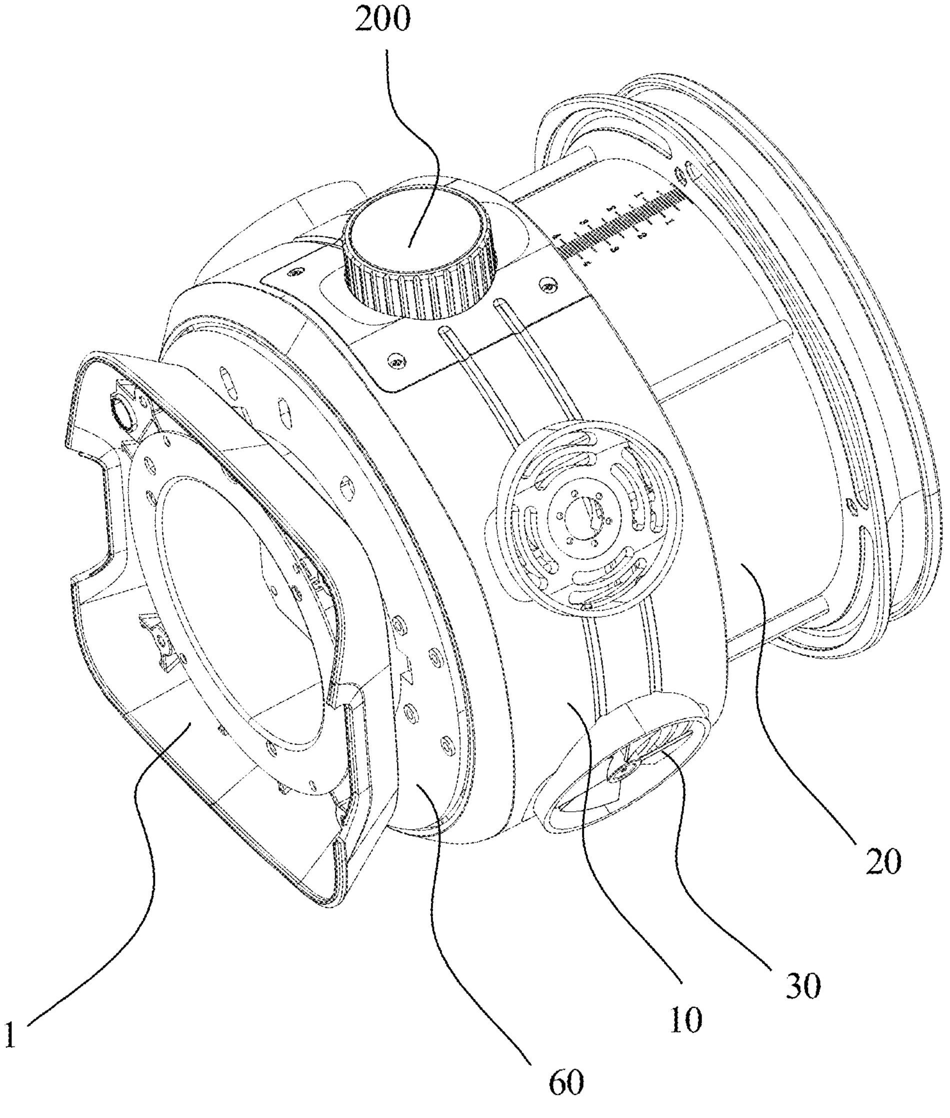
FIG. 7 is a structural diagram of a light adjustment device assembled a light source assembly according to an embodiment of the present invention.

In some embodiments, referring to FIGS. 2, 5, and 7, the light adjustment device further comprises:

a heat sink 60, provided on the end of the mounting component 10 away from the lens 22 and located outside the mounting cavity 11, wherein the heat sink 60 is in close contact with an end of the thermoelectric generator 40 away from the heat-absorbing component 50.

In the embodiments, in order to accelerate the heat dissipation inside the mounting cavity 11 and the lens barrel 20, the heat sink 60 communicating with the external air is provided on the mounting component 10, and the heat sink 60 is in close contact with the end of the thermoelectric generator 40 away from the heat-absorbing component 50, so as to dissipate heat to the external air.

In some embodiments, referring to FIGS. 3-6, the light adjustment device further comprises:

a fastener 70, with one end abutting against the heat sink 60, and the other end sequentially passing through the heat sink 60 and the first mounting hole 13, and connecting to the heat-absorbing component 50; and an insulating sleeve 80, sleeved on the fastener 70 and located on a side of the heat sink 60 away from the lens 22.

In the embodiments, the thermoelectric generator 40 is disposed at the first mounting hole 13 and located between the heat-absorbing component 50 and the heat sink 60. The heat-absorbing component 50 and the heat sink 60 are fixed together by fasteners 70, thereby fixing the thermoelectric generator 40 therebetween. Since one end of the fastener 70 is in contact with the heat-absorbing component 50, in order to prevent the heat absorbed by the heat-absorbing component 50 from being conducted to the heat sink 60 through the fastener 70, and then conducted to the cold end of the thermoelectric generator 40, a heat insulating sleeve 80 is sleeved on the fastener 70 to separate the fastener 70 from a surface of the heat sink 60 away from the lens 22 through the heat insulating sleeve 80.

Optionally, the fastener 70 includes screws, and there can be four screws respectively located on a periphery of the thermoelectric generator 40 to form an abutting engagement with the thermoelectric generator 40, thereby ensuring that the thermoelectric generator 40 is fixed in the first mounting hole 13.

In some embodiments, referring to FIG. 2, the light adjustment device further includes:

a scald-proof cover 90, arranged on an outer side of the end of the mounting component 10 away from the lens 22, for isolating the heat sink 60 from the exterior.

In the embodiments, to prevent the user from accidentally touching the heat sink 60 during use, the scald-proof cover 90 is provided on the mounting component 10 to isolate the heat sink 60 from the exterior through the scald-proof cover 90. In this way, the user will not accidentally touch the heat sink 60 during use, thereby avoiding thermal burns. Optionally, a plurality of through holes are defined in a surface of the scald-proof cover 90 for communicating with the external air.

In some embodiments, referring to FIG. 5, the light adjustment device further includes:

a thermal insulation layer 100, disposed on an inner circumferential surface of the barrel body 21 to reduce the temperature of the barrel body 21.

In the embodiments, the annular heat insulation layer 100 is provided on the inner circumferential surface of the barrel body 21 to further reduce the surface temperature of the barrel body 21. In this way, heat conduction to the surface of the barrel body 21 can be reduced, thereby achieving the purpose of reducing the surface temperature of the barrel body 21.

Figure 9:
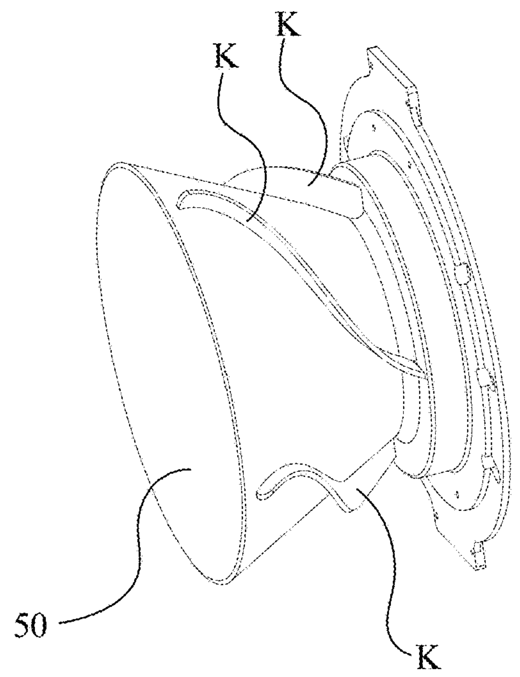
FIG. 9 is another structural diagram of a heat-absorbing component of the light adjustment device.

In some embodiments, referring to FIG. 9, an outer surface of the heat-absorbing component 50 is provided with a plurality of guide plates K, and the plurality of guide plates K are arranged along a circumferential direction of the heat-absorbing component 50, and the guide plates K extend along an axial direction of the lens barrel 20.

In the embodiments, the guide plates K can guide the air introduced by the fan blades 32 into the interior of the lens barrel 20, and the airflow is blocked by the lens 22 and flows toward an inner side of the heat-absorbing component 50, and then flows out from the inner side of the heat-absorbing component 50, and finally flows out from at least one of the heat dissipation holes 12, thereby taking away the heat inside the heat-absorbing component 50 and the lens barrel 20, which can significantly improve the heat dissipation effect.

In some embodiments, referring to FIG. 9, the guide plates K extend along the axial direction of the lens barrel 20 and are inclined along a circumferential direction of the lens barrel 20.

In the embodiments, the guide plates K are arranged obliquely, which can further extend the flow path of the airflow inside the light adjustment device and enhance the heat dissipation effect.

In some embodiments, referring to FIG. 2, the mounting component 10 is provided with a second mounting hole 14 communicating with the mounting cavity 11, and the light adjustment device further includes:

a focusing component 200, disposed at the second mounting hole 14 and connected to the barrel body 21, for driving the barrel 20 to move in a direction towards or away from the mounting component 10, so as to adjust the focal length of the barrel 20 to a preset focal length.

In the embodiments, the focusing component 200 is provided on the mounting component 10 to adjust the focal length of the lens barrel 20 through the focusing component 200. When the focusing component 200 is adjusted, the lens barrel 20 can move in a direction towards or away from the mounting component 10, so that the focal length of the lens barrel 20 is adjusted to a preset focal length. For example, when the focusing component 200 is rotated clockwise, the lens barrel 20 moves in a direction towards the mounting component 10, and when the focusing component 200 is rotated counterclockwise, the lens barrel 20 moves in a direction away from the mounting component 10.

Figure 11:
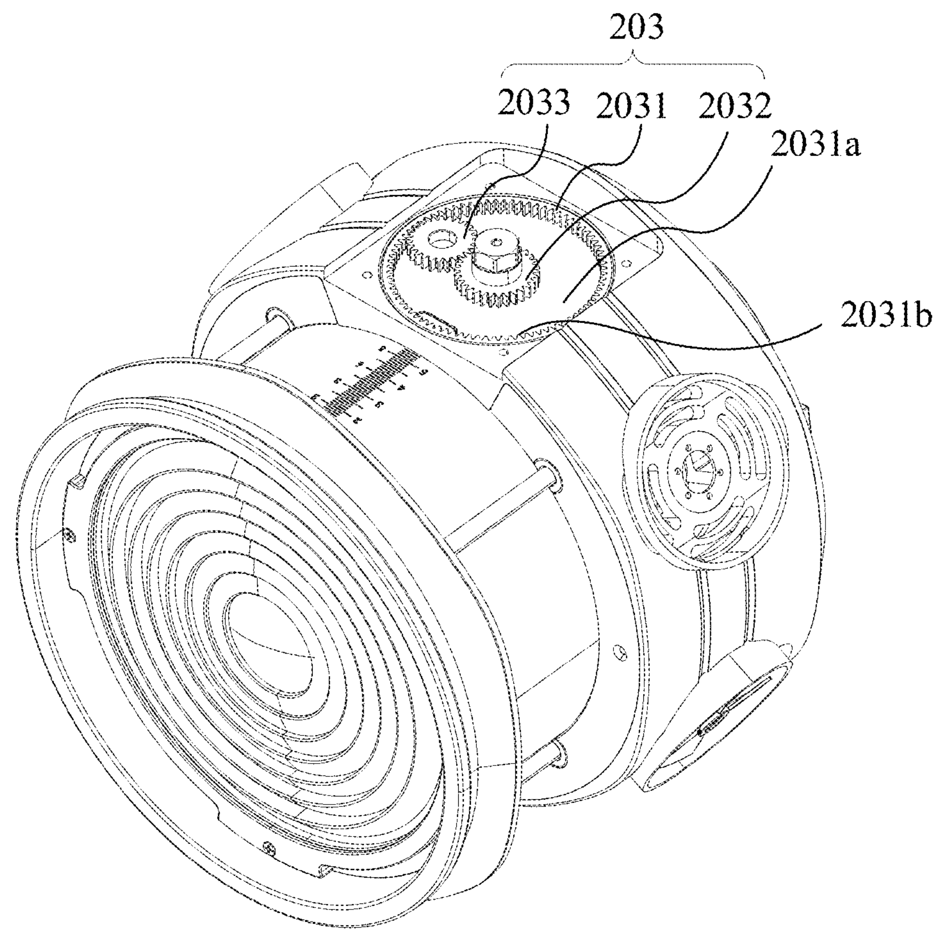
FIG. 11 is a structural diagram of a partial internal structure of the light adjustment device in FIG. 1.
Figure 12:
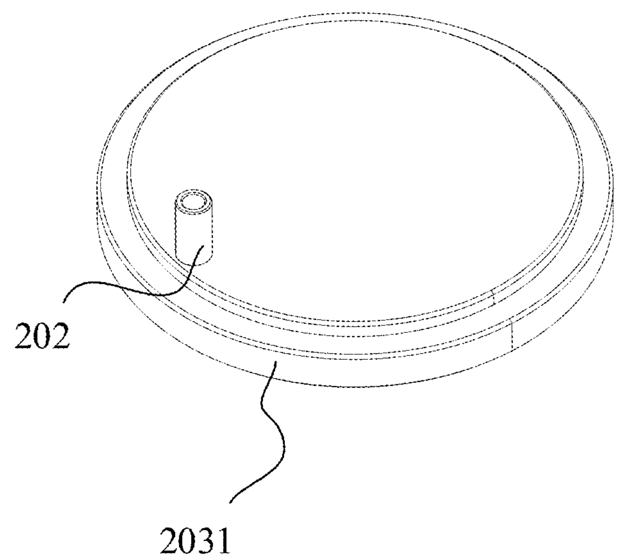
FIG. 12 is a structural diagram of a bottom of the rotating disk in FIG. 11.

In some embodiments, referring to FIG. 2, FIG. 11, and FIG. 12, the barrel body 21 is provided with a limiting sliding groove 211 extending along its circumference. The focusing component 200 comprises:

a drive component 201;

a pushing component 202, movably mounted in the limiting sliding groove 211 along a length direction of the limiting sliding groove 211, used to push the barrel body 21 and the lens 22 to move in the direction of towards or moving away from the mounting component 10; and a transmission component 203, one end of which is connected to the pushing component 202, and the other end is connected to the actuator 201, for transmitting the power generated by the actuator 201 to the pushing component 202.

In the embodiments, the actuator 201 is used for a user to apply a force to drive the transmission component 203 to move, thereby driving the pushing component 202 to slide in the limiting sliding groove 211. The limiting sliding groove 211 extends along a circumference of the barrel body 21, and the pushing component 202 pushes the barrel body 21 and the lens 22 to move in a direction toward or away from the mounting component 10 under the action of the limiting sliding groove 211. Optionally, the actuator 201 includes a rotating button for the user to adjust the focal length by rotating the rotating button. The pushing component 202 is in a rod shape, with one end coupled to the transmission component 203 and the other end passing through the limiting sliding groove 211.

In some embodiments, referring to FIGS. 11 and 12, the transmission component 203 comprises:

- a rotating disk 2031, rotatably arranged at the second mounting hole 14, one side of which is formed with a receiving groove 2031*a*, the peripheral wall of the receiving groove 2031*a* being provided with transmission teeth 2031*b*, and the pushing component 202 being connected to the other opposite side of the rotating disk 2031;
- a driving gear 2032, rotatably arranged within the receiving groove 2031*a* and connected to the actuator 201; and
- a driven gear 2033, rotatably arranged on one side of the driving gear 2032, the driven gear 2033 meshing with the driving gear 2032 and the transmission teeth 2031*b* respectively.

In the embodiments, the transmission component 203 includes the rotating disk 2031, the driving gear 2032, and the driven gear 2033. The rotating disk 2031 is mounted at the second mounting hole 14, and a receiving groove 2031*a* is defined on a surface of the rotating disk 2031 away from the mounting cavity 11. A surface of the rotating disk 2031 towards the mounting cavity 11 is connected to the pushing component 202. A peripheral wall of the receiving groove 2031*a* is provided with transmission teeth 2031*b*. The driven gear 2033 meshes with the driving gear 2032 and the transmission teeth 2031*b*, respectively, to drive the driven gear 2033 to rotate through the driving gear 2032, thereby driving the rotating disk 2031 to rotate, and further driving the pushing component 202 to rotate.

When adjusting the focal length, the actuator 201 drives the driving gear 2032 to rotate, thereby causing the driven gear 2033 to rotate, which in turn causes the rotating disk 2031 to rotate. Since the pushing component 202 is connected to the rotating disk 2031, the pushing component 202 will rotate along with the rotating disk 2031. Since the pushing component 202 passes through the limiting sliding groove 211, the pushing component 202 will push the lens barrel 20 in the radial direction of the barrel body 21, so that the lens barrel 20 moves towards or away from the mounting component 10, thereby achieving the purpose of adjusting the focal length.

Figure 13:
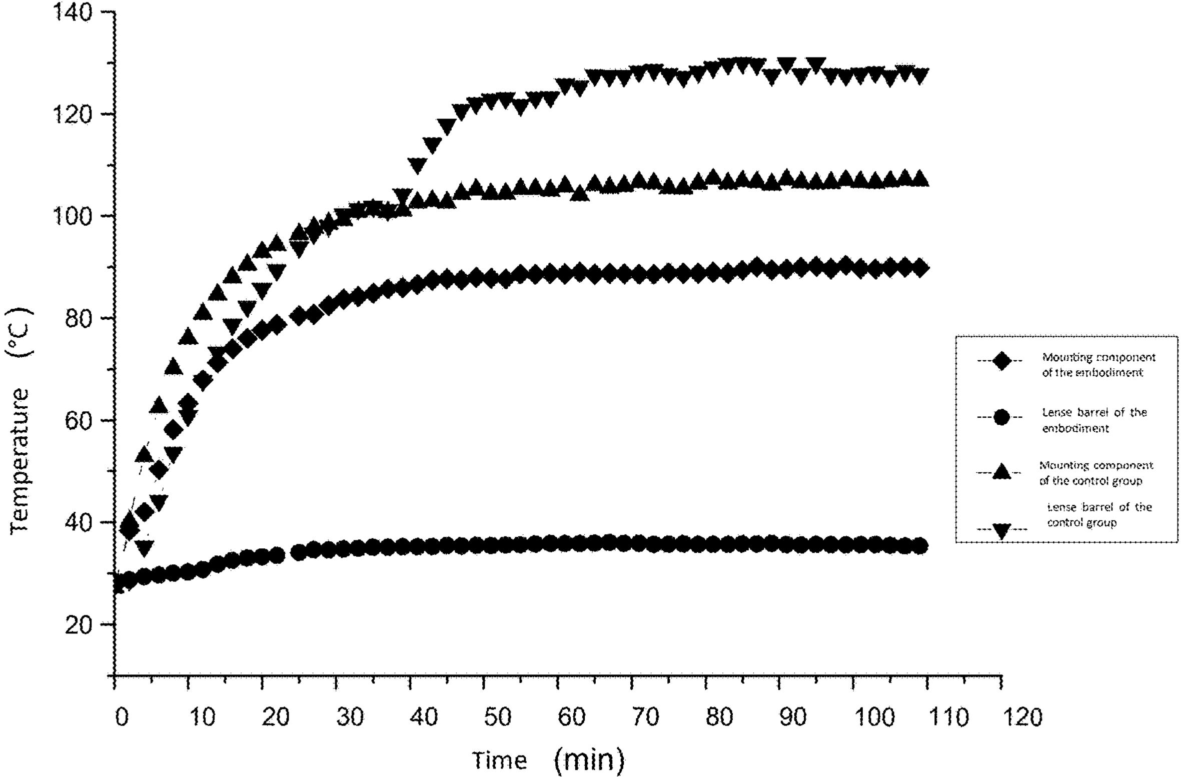
FIG. 13 is a curve plot of temperatures of the light adjustment device before and after the installation of the heat dissipation component.

As shown in FIG. 13, experiments demonstrate that a surface temperature of the light adjustment device after installing the heat dissipation component 30 provided by the present invention is significantly lower than that of an existing light adjustment device. That is, by dissipating heat from the light adjustment device through the heat dissipation component 30, the surface temperature of the light adjustment device can be greatly reduced, avoiding scalding or thermal burns, and preventing thermal deformation.

The present invention also provides a photography light, which includes the light source assembly 1 and the light adjustment device as described in the foregoing embodiments. The specific structure of the light adjustment device refers to the above embodiments. Since the photography light adopts all the technical solutions of the above embodiments, it has at least all the technical effects brought by the technical solutions of the above embodiments, and will not be repeated here.

The present invention also provides a photography system, which includes a photography device and the photography light described in the foregoing embodiments. The specific structure of the photography light refers to the above embodiments. Since the present photography system adopts all the technical solutions of all the above embodiments, it has at least all the technical effects brought by the technical solutions of the above embodiments, and will not be repeated here.

Without contradicting each other, those skilled in the art can combine and integrate the different embodiments or examples described in this specification, as well as the features of different embodiments or examples.

The foregoing descriptions are merely partial or preferred embodiments of the present invention. Neither the text nor the drawings shall be construed to limit the scope of protection of the present invention. Any equivalent structural changes made based on the contents of the specification and drawings of the present invention under the concept of the present invention as a whole, or direct or indirect application in other related technical fields, shall be included in the scope of the present invention.

The invention claimed is:

1. A light adjustment device, comprising:

- a mounting component, internally forming a mounting cavity, the mounting component being provided with a plurality of heat dissipation holes communicating with the mounting cavity;
- a lens barrel, comprising a barrel body and a lens, with one end of the barrel body located inside the mounting cavity and the other end located outside the mounting cavity, and the lens being disposed within the barrel; and
- a heat dissipation component, disposed at one of the heat dissipation holes, the heat dissipation component comprising a motor and fan blades connected to the motor, to discharge heat from the mounting cavity and the lens barrel to the exterior through flowing air;
- wherein the light adjustment device further comprises a thermoelectric generator, disposed on the mounting component and electrically connected to the motor;
- one end of the thermoelectric generator is in contact with air inside the mounting cavity, and another end is in contact with the air outside the mounting cavity, so as to generate a temperature difference between the two ends of the thermoelectric generator and convert thermal energy into electrical energy; and
- the mounting component is provided with a first mounting hole, the first mounting hole is arranged at one end of the mounting component away from the lens and communicates with the mounting cavity, and the thermoelectric generator is arranged at the first mounting hole.

2. The light adjustment device according to claim 1, wherein the light adjustment device comprises a heat-absorbing component disposed within the mounting cavity for absorbing heat within the mounting cavity; and

- one end of the thermoelectric generator is in close contact with the heat-absorbing component.

3. The light adjustment device according to claim 2, wherein the heat-absorbing component is configured with a hollow structure, and the heat-absorbing component is used to enclose a periphery of a light source assembly for isolating the light source assembly from the mounting component.

4. The light adjustment device according to claim 3, wherein one end of the lens barrel is sleeved between the mounting component and the heat-absorbing component.

5. The light adjustment device according to claim 3, wherein the heat-absorbing component comprises:

a first barrel portion, connected to the end of the mounting component that is distal to the lens and in close contact with one end of the thermoelectric generator; and a second barrel portion, connected to the first barrel portion, wherein the diameter of the second barrel portion gradually increases from the end of the mounting component away from the lens to an end close to the lens.

6. The light adjustment device according to claim 3, wherein an inner side of the heat-absorbing component is provided with a light-absorbing inner lining layer.

7. The light adjustment device according to claim 3, wherein an outer surface of the heat-absorbing component is provided with a plurality of guide plates, the guide plates are arranged along a circumferential direction of the heat-absorbing component, and the guide plates extend along an axial direction of the lens barrel.

8. The light adjustment device according to claim 7, wherein the guide plates extend along the axial direction of the lens barrel and are inclined along a circumferential direction of the lens barrel.

9. The light adjustment device according to claim 2, wherein the light adjustment device further comprises a heat sink, disposed on the mounting component at the end away from the lens and located outside the mounting cavity; and the heat sink is in close contact with the thermoelectric generator at an end away from the heat-absorbing component.

10. The light adjustment device according to claim 9, wherein the light adjustment device further comprises:

a fastener, with one end abutting the heat sink and the other end sequentially passing through the heat sink and the first mounting hole, then connecting to the heat-absorbing component; and an insulating sleeve, fitted onto the fastener and positioned on a side of the heat sink away from the lens.

11. The light adjustment device according to claim 9, wherein the light adjustment device further comprises a scald-proof cover arranged on an outer side of the end of the mounting component away from the lens, for isolating the heat sink from the exterior.

12. The light adjustment device according to claim 2, wherein the mounting component is provided with a second mounting hole communicating with the mounting cavity, and the light adjustment device further comprises:

a focusing component, disposed at the second mounting hole and connected to the barrel body, for driving the lens barrel to move in a direction towards or away from the mounting component, so that the focal length of the lens barrel is adjusted to a predetermined focal length.

13. The light adjustment device according to claim 12, wherein the barrel body is provided with a limiting sliding groove extending along its circumference, and the focusing component comprises:

an actuator;

a pushing component, movably mounted in the limiting sliding groove along a length direction of the limiting sliding groove, used to push the barrel body to move in the direction of towards or away from the mounting component; and a transmission component, one end of which is connected to the pushing component, and the other end is connected to the actuator, for transmitting the power generated by the actuator to the pushing component.

14. The light adjustment device according to claim 13, wherein the transmission component comprises:

a rotating disk, rotatably arranged at the second mounting hole, one side of which is formed with a receiving groove, a peripheral wall of the receiving groove being provided with transmission teeth, and the pushing component being connected to the other opposite side of the rotating disk;

a driving gear, rotatably arranged within the receiving groove and connected to the actuator; and a driven gear, rotatably arranged on one side of the driving gear, the driven gear meshing with the driving gear and the transmission teeth respectively.

15. A photography system, comprising a photography device and the photography light according to claim 14.

16. The light adjustment device according to claim 1, wherein the light adjustment device further comprises a thermal insulation layer disposed on an inner circumferential surface of the barrel body for reducing the temperature of the barrel body.

17. A photography light, comprising a light source assembly and a light adjustment device according to claim 1.

* * * * *